(12) United States Patent
Wang et al.

(10) Patent No.: US 7,701,508 B2
(45) Date of Patent: Apr. 20, 2010

(54) ACCURATE MOTION DETECTION FOR THE COMBINATION OF MOTION ADAPTIVE AND MOTION COMPENSATION DE-INTERLACING APPLICATIONS

(75) Inventors: Nien-Tsu Wang, Los Gatos, CA (US); Shi-Chang Wang, Sunnyvale, CA (US); Hsi-Chen Wang, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1176 days.

(21) Appl. No.: 11/290,194

(22) Filed: Nov. 30, 2005

(65) Prior Publication Data

US 2007/0121001 A1 May 31, 2007

(51) Int. Cl.
*H04N 7/01* (2006.01)
(52) U.S. Cl. .................. 348/452; 348/448; 348/451; 348/620; 348/700
(58) Field of Classification Search .............. 348/448, 348/452, 451, 699, 620, 610, 404.1, 431.1, 348/700; 375/240.02, 240.13; 382/239, 382/236
See application file for complete search history.

(56) References Cited

U.S. PATENT DOCUMENTS 5,796,437 A * 8/1998 Muraji et al. ............... 348/452
5,936,676 A * 8/1999 Ledinh et al. ............... 348/452
7,012,649 B2 * 3/2006 Michel ...................... 348/448
7,057,665 B2 * 6/2006 Jung et al. .................. 348/452
7,142,247 B2 * 11/2006 Jung ......................... 348/452
7,193,655 B2 * 3/2007 Nicolas ...................... 348/448
7,224,399 B2 * 5/2007 Song ......................... 348/452
2003/0081144 A1 * 5/2003 Mohsenian ................. 348/448

* cited by examiner

Primary Examiner—David L Ometz
Assistant Examiner—Jean W Désir
(74) Attorney, Agent, or Firm—Christopher P. Maiorana, PC

(57) ABSTRACT

A method for de-interlacing is disclosed. The method generally includes the steps of (A) determining a plurality of target mode values for a target pixel being synthesized to convert a current field into a current frame, wherein at least two of the target mode values are based on both (i) a plurality of original pixels and (ii) a plurality of synthesized pixels in a plurality of synthesized frames, (B) generating a plurality of candidate values for the target pixel using a plurality of interpolation techniques that includes a motion estimation interpolation utilizing a particular one of the synthesized frames and (C) selecting a particular one of the candidate values for the target pixel in response to the target mode values.

20 Claims, 11 Drawing Sheets

- ORIGINAL PIXEL
× TARGET PIXEL $F[T-1]$ - Field T-1. In the example above, $F[T-1]$ is a field with odd polarity.
$F_S[T-1]$ - Target Field T-1. $F_S[T-1]$ is a target field with even polarity.
$F[T-1][n, m]$ - Pixel $n$ in line $m$ of field $F[T-1]$.
  where $0 <= n <= $ FieldWidth-1,
  $0 <= m <= $ FieldHeight-2 and $m$ mod 2 = 0 (in an even field), or
  $1 <= m <= $ FieldHeight-1 and $m$ mod 2 = 1 (in an odd field)

$E1 = |F[T-1][n,m-1] - F[T-1][n,m+1]|$
$E2 = |F[T-2][n,m] - F[T-2][n,m-2]|$
$E3 = |F[T-2][n,m] - F[T-2][n,m+2]|$
$E4 = |F[T-2][n,m] - F[T-1][n,m-1]|$
$E5 = |F[T-2][n,m] - F[T-1][n,m+1]|$

⊗ THE MOTION MODE OF SYNTHESIZED PIXEL
× TARGET PIXEL
● ORIGINAL PIXEL

EQ. (1) $SAD_{i,j} = \sum_{x=i}^{x=i+4} \sum_{k=n-2}^{k=n+2} |F[T-1][k,m-1] - F[T-2][x,j]| + \sum_{x=i}^{x=i+2} \sum_{k=n-2}^{k=n+2} |F[T-1][k,m+1] - F[T-2][x,j+2]|$ WHERE n-4 ≤ i ≤ n AND m-3 ≤ j ≤ m+1

EQ. (2) $SAD'_{i,m+2} = \sum_{x=i-1}^{i+1} |F[T-2][i,m+2] - F[T-2][x,m+1]| + \sum_{x=i-1}^{i+1} |F[T-2][i,m+2] - F[T-2][x,m+3]|$ WHERE i DENOTES THESE THREE PIXELS' HORIZONTAL LOCATIONS, n+1, n+2, AND n+3

EQ. (3) $SAD''_{i,m} = \sum_{x=i-1}^{n+1} |F[T-2][i,m+2] - F[T-1][x,m-1]| + \sum_{x=n-1}^{n+1} |F[T-2][i,m+2] - F[T-1][x,m+1]|$ WHERE i GENERALLY DENOTES THE HORIZONTAL LOCATIONS OF THE THREE CANDIDATE PIXELS IN THE MOVING SUB-WINDOW, WHICH MAY BE n+1, n+2, AND n+3

EQ. (4) $SAD_i = \sum_{x=n-1}^{n+1} |F_i - F[T-1][x,m-1]| + \sum_{x=n-1}^{n+1} |F_i - F[T-1][x,m+1]|$ WHERE i DENOTES ONE OF THE TWO CANDIDATES, $F_{INTER}$ OR $F_{ME}$ EQ. (5) $SAD_{i,up} = \sum_{x=n-1}^{n+1} |F_i - F[T-1][x,m-1]|$ EQ. (6) $SAD_{i,down} = \sum_{x=n-1}^{n+1} |F_i - F[T-1][x,m+1]|$ WHERE i DENOTES ONE OF THE TWO CANDIDATES, $F_{ELA}$ OR $F_{ME}$

FIG. 9

ACCURATE MOTION DETECTION FOR THE COMBINATION OF MOTION ADAPTIVE AND MOTION COMPENSATION DE-INTERLACING APPLICATIONS

FIELD OF THE INVENTION

The present invention relates to video de-interlacing generally and, more particularly, to accurate motion detection for the combination of motion adaptive and motion compensation de-interlacing applications.

BACKGROUND OF THE INVENTION

De-interlacing has become an important technique because of the popularity of progressive scan television devices. Since the invention of television more than 70 years ago, the interlaced scan has been used exclusively due to a tradeoff between frame rate and transmission bandwidth utilization. The interlaced scan doubles the frame rate as compared with a progressive scan, allowing still or slow-moving areas to be perceived with higher vertical detail, while fast-moving areas are perceived with a higher temporal rate at half vertical resolution. However, if an interlaced-scan video is directly shown on progressive devices, defects like line crawling, edge-flicker, and jagged edges appear and make the viewer uncomfortable.

De-interlacing is conventionally accomplished using a software approach or a hardware approach. BOB and Weave are two low-complexity de-interlacing methods commonly adopted in the software approaches. BOB is an intra-field interpolation method that uses a single field to reconstruct one progressive frame. However, the vertical resolution is halved and the image is blurred using the BOB method. Weave is a simple inter-field de-interlacing method directly combining two interlaced fields into a single progressive frame. However, the line-crawling effect will arise in motion areas created with Weave.

For hardware-base de-interlacing approaches, motion adaptive methods are commonly used in consumer electronics. The basic concept is to select an appropriate interpolation method according to the motion in different areas of an image. In particular, spatial filtering is selected in motion areas and temporal filtering is selected in static areas. Hence, the motion adaptive de-interlacing method combines the advantages of both intra-field de-interlacing and inter-field de-interlacing. However, some motion detection errors still exist with the conventional motion adaptive methods.

The most advanced hardware de-interlacing methods use a motion compensation scheme where the interpolation is performed along a motion trajectory. The conventional motion compensation methods are useful for getting high resolution and flicker-free pictures in motion areas. However, the motion compensation approaches are highly dependent on the accuracy of motion estimation, which results in high hardware complexity. In particular, sub-pixel accuracy is a condition to reflect the true motion of an object. However, too many sub-pixel interpolations fail to retain true image resolution.

SUMMARY OF THE INVENTION

The present invention concerns a method for de-interlacing. The method generally comprises the steps of (A) determining a plurality of target mode values for a target pixel being synthesized to convert a current field into a current frame, wherein at least two of the target mode values are based on both (i) a plurality of original pixels and (ii) a plurality of synthesized pixels in a plurality of synthesized frames, (B) generating a plurality of candidate values for the target pixel using a plurality of interpolation techniques that includes a motion estimation interpolation utilizing a particular one of the synthesized frames and (C) selecting a particular one of the candidate values for the target pixel in response to the target mode values.

The objects, features and advantages of the present invention include providing accurate motion detection for the combination of motion adaptive and motion compensation de-interlacing applications that may (i) provide more accurate motion information than conventional approaches, (ii) provide motion adaptive de-interlacing, (iii) provide motion compensating de-interlacing, (iv) compensate for forced-edge artifacts in intra-field interpolations, (v) compensate for edge flicker in inter-field interpolations, (vi) provide a high quality de-interlaced image and/or (vii) provide a low cost solution to de-interlacing.

BRIEF DESCRIPTION OF THE DRAWINGS

These and other objects, features and advantages of the present invention will be apparent from the following detailed description and the appended claims and drawings in which:

FIG. 9 is a list of equations;

DETAILED DESCRIPTION OF THE PREFERRED EMBODIMENTS

The present invention generally concerns a pixel-based de-interlacing engine that is both motion adaptive and motion compensating. The motion detector operation may provide more accurate motion information for a target pixel than conventional solutions. The improved motion accuracy may be based on information from one or more original input fields and one or more preceding synthesized fields.

The motion compensation operation generally has a limited programmable search window (e.g., 9 horizontal pixels×7 vertical pixels) in a previous synthesized frame. A result from the motion compensation operation may be used to compensate for (i) forced-edge artifacts in intra-field interpolations and (ii) edge flicker of in inter-field interpolations.

Existing theoretical models for opposite parity field motion detection and compensation generally indicate that any direct motion compensation between fields with opposite parities may not result in satisfactory performance. However, the theoretical model results are generally based on a field-mode analysis. In contrast, the motion compensation process of the present invention may be performed within a small area. In many cases, a closed relationship generally exists between the target pixel and a corresponding small area in the previous synthesized frame. The close relationship may by used to achieve better motion detection results and motion compensation results than with conventional approaches.

The motion compensation result may be a single candidate among a number of other interpolation candidates. The other interpolation operations may include, but are not limited to, an intra-field interpolation and an inter-field interpolation processes. A final result (or value) for the target pixel may be determined according to the motion information calculated and the edge information of the target pixel.

Figure 1:
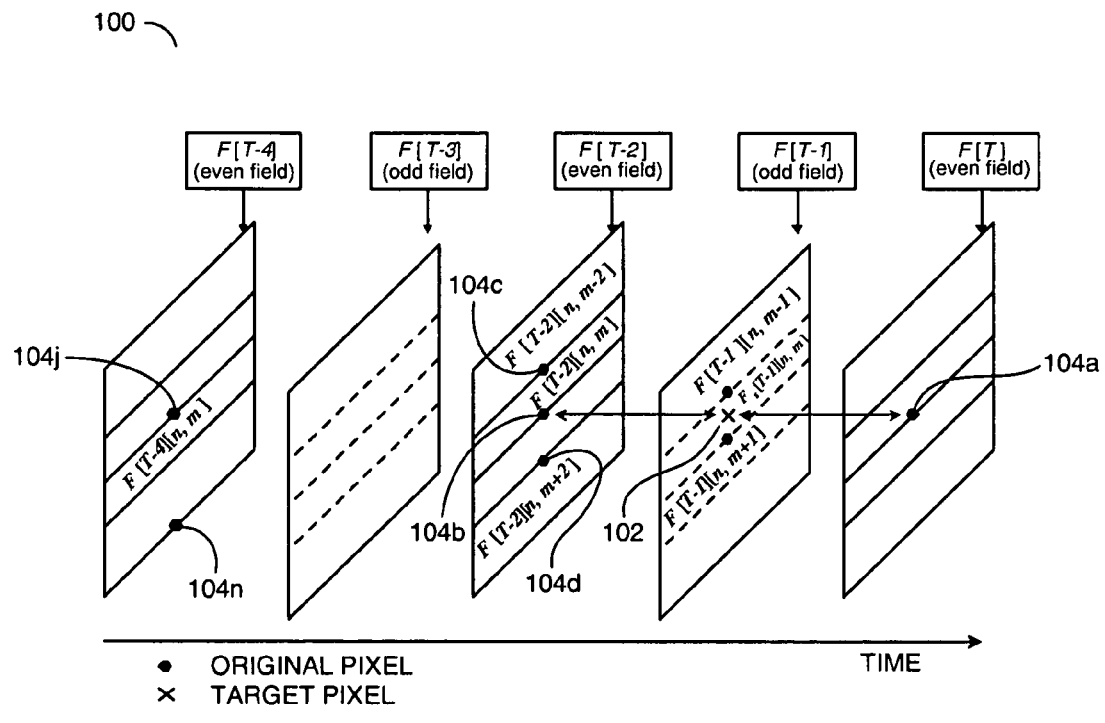
FIG. 1 is a diagram of an example set of pictures.

Referring to FIG. 1, a diagram of an example set 100 of pictures is shown. The set 100 may be used to illustrate spatial and temporal relationships between a target pixel 102 and other reference pixels 104a-104n. In the example, let F[T] denote an incoming interlaced field with an even polarity at a time T. Let F[T−1] denote an odd interlaced field at a time T−1 that posses the target pixel 102. F[L][N,M] may denote a pixel in the field F[L] (where T−4≦L≦T) at a horizontal (width) position N and a vertical (height or line) position M. Therefore, a goal may be to generate (or interpolate) a synthesized even polarity field (e.g., $F_S[T-1]$) at the time T−1. A complete de-interlaced frame may be created by combining the original field F[T−1] and the synthesized field $F_S[T-1]$. The other preceding fields (e.g., F[T−2], F[T−3], and F[T−4]) may also be utilized for synthesizing the de-interlaced frame. One of ordinary skill in the art would understand that the present invention also works where the target pixel 102 is disposed in an even polarity field.

Figure 2:
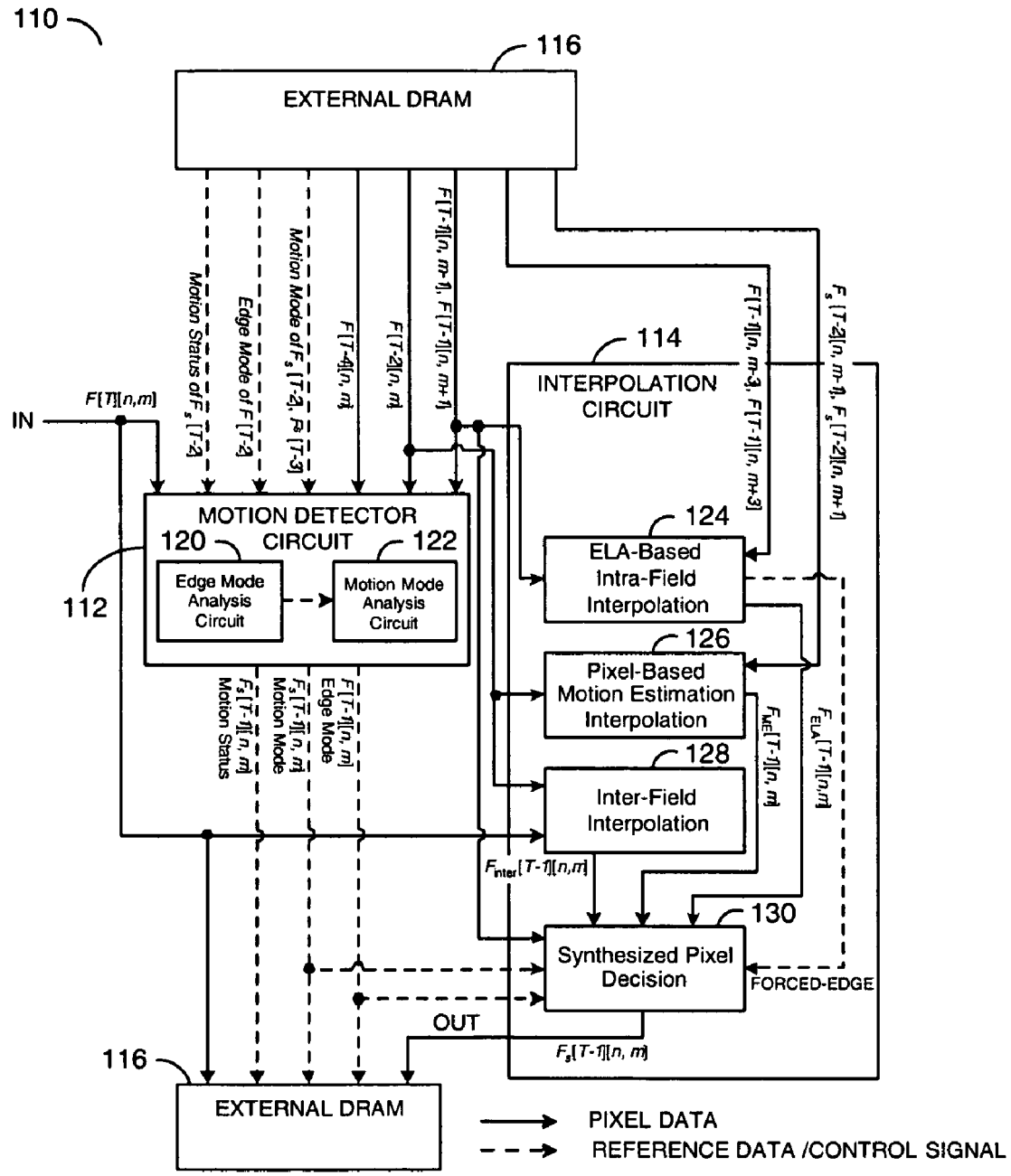
FIG. 2 is a block diagram of a system for de-interlacing in accordance with a preferred embodiment of the present invention.

Referring to FIG. 2, a block diagram of a system 110 for de-interlacing is shown in accordance with a preferred embodiment of the present invention. The system (or apparatus) 110 generally comprises a circuit (or module) 112, a circuit (or module) 114 and a memory circuit (or module) 116 (shown in two places). An input signal (e.g., IN) carrying the original pixels (e.g., F[T][N,M]) may be received by the circuit 112. An output signal (e.g., OUT) carrying data for the synthesized target pixels (e.g., $F_S[T-1]$ [N,M]) may be generated and presented by the circuit 114. The memory circuit 116 may be directly connected to both the circuits 112 and 114 to temporarily store read and write data.

The circuit 112 may be referred to as a motion detector circuit. The motion detector circuit 112 may be operational to (i) to determine whether the current target pixel 102 belongs to a motion area or a still area and (ii) determine whether the current target pixel 102 is on an edge location or not. The motion detector circuit 112 generally reads multiple (e.g., four) fields of pixel data (e.g., F[T], F[T−1], F[T−2], and F[T−4]) and multiple (e.g., three) kinds of reference data (e.g., a motion mode data, a motion status data and an edge mode data) from the memory circuit 116. The motion detector circuit 112 may be further operational to generate and present all of the reference data types calculated for the target pixel 102 for use in processing a subsequent (e.g., next) interlaced field.

The circuit 114 may be referred to as an interpolation circuit. The interpolation circuit 114 may be operational to (i) generate multiple (e.g., three) candidate values for each target pixel 102 and (ii) select one of the candidate values to use for the synthesized target pixel 102. A first of the candidate values (e.g., $F_{ELA}[T-1]$ [N,M]) may be generated from an edge-based line average (ELA) interpolation. Another of the candidate values (e.g., $F_{ME}[T-1]$ [N,M]) may be generated from a pixel-based motion estimation (ME) interpolation. Still another of the candidate values (e.g., $F_{INTER}[T-1]$ [N,M]) may be generated from an inter-field (INTER) interpolation. Finally, according to the reference data, (e.g., motion mode value, edge mode value and forced-edge value), a decision operation may be performed to identify a particular candidate value from among the several candidate values to present as the synthesized target pixel value.

The memory circuit 116 may be implemented as a dynamic random access memory (DRAM) circuit. The memory circuit 116 may be fabricated on a first chip whereas the motion detector circuit 112 and the interpolation circuit 114 may be fabricated on a second chip. As such, the memory circuit 116 may be referred to as an external DRAM.

The motion detector circuit 112 generally comprises a circuit (or module) 120 and a circuit (or module) 122. The circuit 120 may be referred to as an edge mode analysis circuit. The edge mode analysis circuit 120 may be operational to determine if the target pixel 102 is at an edge in an image represented by the current field F[T−1]. The circuit 122 may be referred to as a motion mode analysis circuit. The motion mode analysis circuit 122 may be operational to determine if the target pixel 102 is within an area of the image that is either stationary or moving.

The interpolation circuit 114 generally comprises a circuit (or module) 124, a circuit (or module) 126, a circuit (or module) 128 and a circuit (or module) 130. The circuit 124 may be referred to as an ELA-based intra-field interpolation circuit (or ELA interpolation circuit for short). The ELA interpolation (filter) circuit 124 may be operational to generate the candidate value $F_{ELA}[T-1][N,M]$ utilizing a predetermined number of the original pixels 104a-104n in the current field F[T−1]. The ELA interpolation circuit 124 may also be operation to generate and present a mode value in a mode signal (e.g., FORCED-EDGE). The ELA interpolation generally utilizes directional correlation to interpolate a missing line between two adjacent lines of the even (or odd) field. Further details for the operation of the interpolation circuit 114 may be covered later.

The circuit 126 may be referred to as a pixel-based motion estimation interpolation circuit (or ME interpolation circuit for short). The ME interpolation (or filter) circuit 126 may be operational to generate the candidate value $F_{ME}[T-1][N,M]$ utilizing a predetermined number of the original pixels, 104a-104n and a predetermined number of the synthesized pixels all from a previously synthesized frame (e.g., $F[T-2]+F_S[T-2]$).

The circuit 128 may be referred to as an inter-field interpolation circuit. The inter-field interpolation (or filter) circuit 128 may be operational to generate the candidate value $F_{INTER}[T-1][N,M]$ utilizing a predetermined number (e.g., two) of the original pixels 104a-104n having a same spatial position (e.g., [N,M] as the target pixel 102, but in different fields (e.g., in F[T] and in F[T−2]) as the target pixel 102 (e.g., in F[T−1]).

The circuit 130 may be referred to as a synthesized pixel decision circuit (or decision circuit for short). The decision circuit 130 may be operational to determine which of the candidate values received from the interpolation circuits 124-128 may be used as the value of the synthesized target pixel 102. The determination may be based on target mode values (e.g., the edge mode value, the motion mode value and the forced-edge mode value) received from the motion detector circuit 112 and the ELA interpolation circuit 124.

Video scenes generally contain moving objects and a stationary background at the same time. During the de-interlacing process for stationary pixels, the Weave scheme between inter fields may be a better choice than the BOB scheme for preserving vertical resolution. However, for moving objects, the direct Weave scheme generally causes combing artifacts on the edges of the moving objects because of the position shift of the moving objects in each different field. Thus, different de-interlacing approaches, such as intra-field filtering schemes and motion compensation schemes, may be better suited for the moving pixels. In order to obtain a best visual quality for the video image, the accuracy of motion detection for separating moving and stationary pixels is considered.

Figure 3:
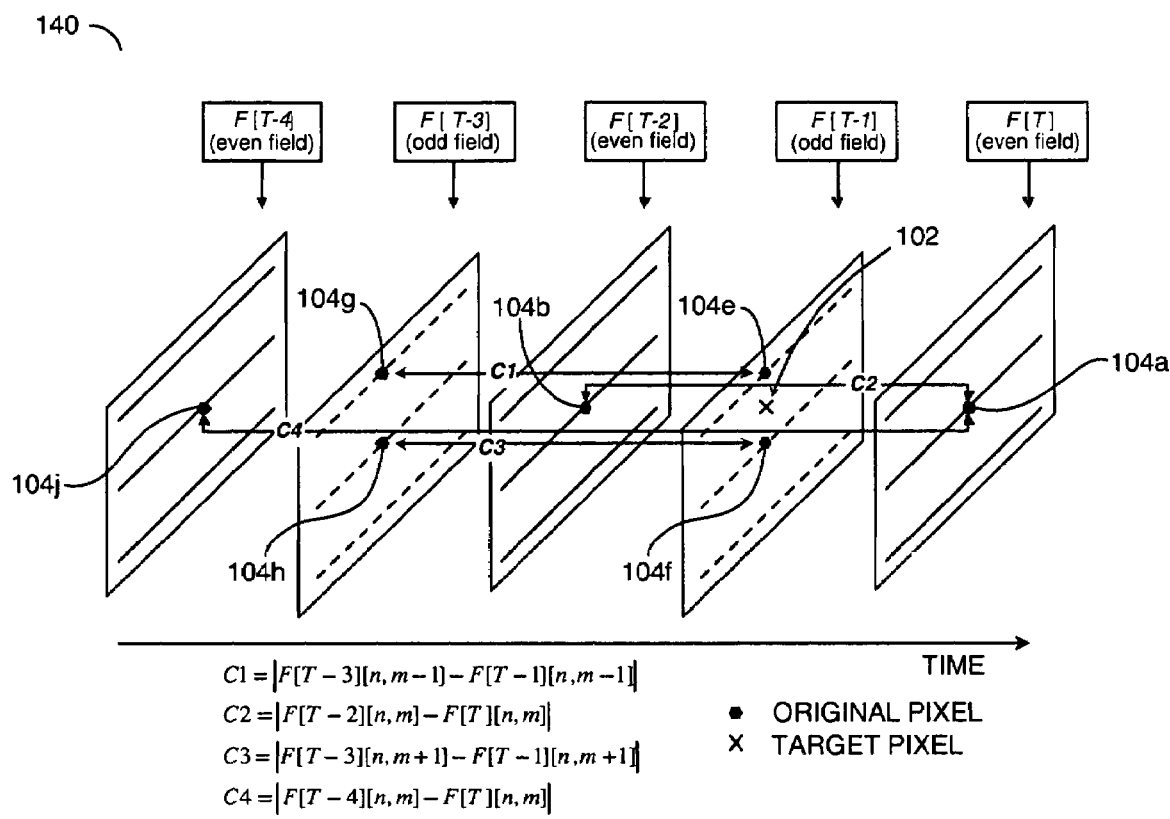
FIG. 3 is a diagram of an example set of fields used for determining a motion situation of a target pixel from original pixels.

Referring to FIG. 3, a diagram of an example set 140 of fields used for determining a motion situation of the target pixel 102 from the original pixels is shown. To increase the motion detection accuracy, the motion detector circuit (or engine) 112 generally adopts multiple (e.g., two) types of motion information. The motion information may be obtained from the original interlaced pixels 104a-104n and from the previous synthesized pixels. Obtaining the motion information from the original pixels 104a-104n is discussed first.

The motion detector circuit 112 may check absolute differences in luminance for several (e.g., four) original pixel pairs. The original pixel pairs may be both temporally and spatially proximate the target pixel 102. Each luminance difference may be referred to as a pixel-distance. A first pixel-distance (e.g., C1) may be measured spatially above the target pixel 102. A second pixel-distance (e.g., C2) may be measured spatially through the target pixel 102. A third pixel-distance (e.g., C3) may be measured spatially below the target pixel 102. A fourth pixel-distance (e.g., C4) may also be measured spatially through the target pixel 102.

When all four pixel-distances, C1, C2, C3, and C4, are less than a static threshold (e.g., $TH_{static}$), the target pixel 102 may be considered to be in a stationary area. However, the stationary assignment may be wrong in some situations, for example, video scenes containing high-speed objects in motion. Therefore, the motion information of preceding synthesized pixels may be used to make a final decision regarding the target pixel 102.

The static threshold $TH_{static}$ may have two settings. Distinguishing between the two settings made by determined by an edge mode value for the current target pixel 102. If the target pixel 102 is on an edge within the image, a higher threshold may be used. Therefore, the target pixel 102 may easily fall into a still-pixel category. The target pixel 102 may then be interpolated by inter-field filtering in order to reduce the edge-flicker artifacts. If the target pixel 102 is not on an edge, a lower threshold may be used.

The motion detector circuit 112 may not read the pixel data of the field F[T-3] from memory circuit 116 in order to calculate the value of C1 and C3. The values for C1 and C3 may have been calculated and stored into a motion-status-map region of the memory circuit 116 during the process of calculating the C2 value of the preceding synthesized field. Each value for C1 and C3 may be implemented in a few (e.g., two) bits. Compared with fetching 8-bit or 10-bit pixel data, the 2-bit approach may reduce a memory bandwidth utilization to the memory circuit 116.

Figure 4:
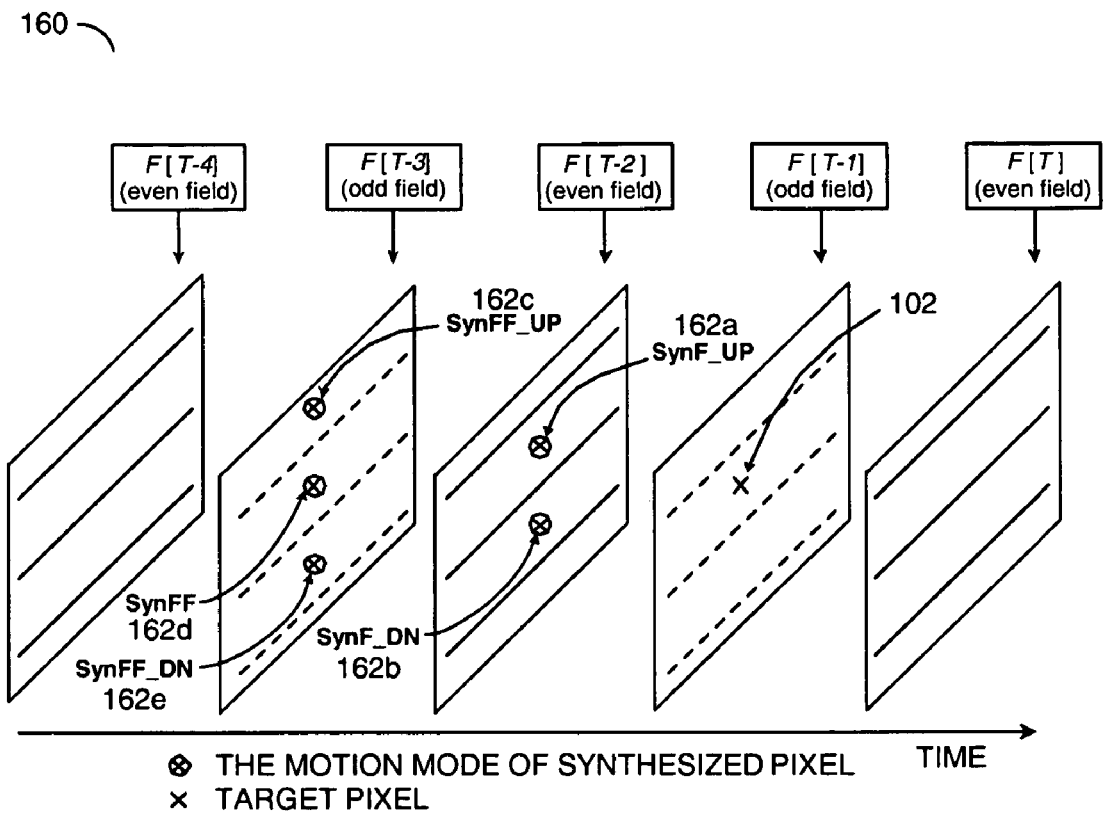
FIG. 4 is a diagram of an example set of fields used for determining motion detection from synthesized pixels.

Referring to FIG. 4, a diagram of an example set 160 of fields used for determining motion detection from synthesized pixels is shown. Motion detection for the target pixel 102 in the current field F[T-1] may be determined based on a number (e.g., five) of synthesized pixels 162a-162e in multiple (e.g., two) previously synthesized frames (e.g., at T-2 and T-3).

When an object only exists in the same parity fields, the motion status of the target pixel 102 may be detected incorrectly if the original input pixels 104a-104n are the sole reference source. Therefore, the motion information of the preceding synthesized pixels 162a-162e may be used as a second reference source in the motion detection scheme.

The motion modes of two synthesized pixels 162a-162b from the preceding field F[T-2] and the motion modes of three synthesized pixels 162c-162e from another preceding field F[T-3] may be examined. A motion mode value for each of the synthesized pixels 162a-162e may be a 1-bit datum that records whether the respective synthesized pixel 162a-162n is a moving pixel or a stationary pixel. After the motion mode value of the current target pixel 102 is determined, the motion mode value of the target pixel 102 may also be stored into the motion mode region of the memory circuit 116 for future reference.

Figure 5:
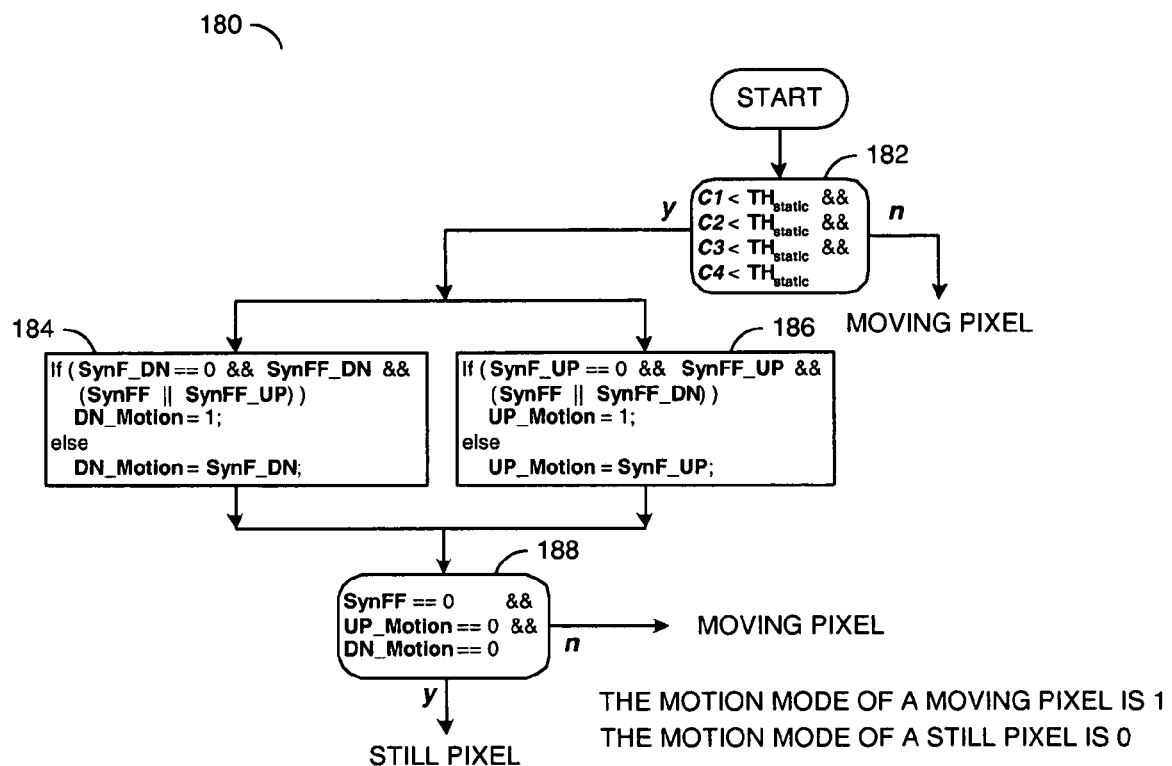
FIG. 5 is a flow diagram of an example method for determining a motion mode value of the target pixel.

Referring to FIG. 5, a flow diagram of an example method 180 for determining the motion mode value of the target pixel 102 is shown. The method 180 generally comprises a step (or block) 182, a step (or block) 184, a step (or block) 186 and a step (or block) 188.

If any one or more of the pixel-distance values C1, C2, C3 and/or C4 for the target pixel 102 are greater than or equal to the static threshold $TH_{static}$ (e.g., the no branch of step 182), the target pixel 102 may be considered a moving pixel and the associated motion mode value set accordingly. When the values C1, C2, C3, and C4 for the target pixel 102 are all less than the static threshold $TH_{static}$ (e.g., the yes branch of step 182), the target pixel 102 may not be immediately recognized as a still pixel. In the step 184, the motion of several previous synthesized pixels in the previous fields (e.g., pixels SynF_DN, SynFF_DN, SynFF and SynFF_UP) may be processed to determine if the target pixel 102 has a downward motion. In the step 186, the motion of the several previously synthesized pixels in the previous fields (e.g., SynF_UP, SynFF_UP, SYNFF and SYNFF_DN) may be processed to determine if the target pixel 102 has an upward motion. If all of the checks indicate a still pixel (e.g., the yes branch of step 188) the motion mode value of the target pixel 102 may be set to a still value (e.g., a logical zero). Otherwise, if one or more of the checks detect motion (e.g., the no branch of the step 188), the motion mode value of the target pixel 102 may be set to a moving value (e.g., a logical one).

Figure 6:
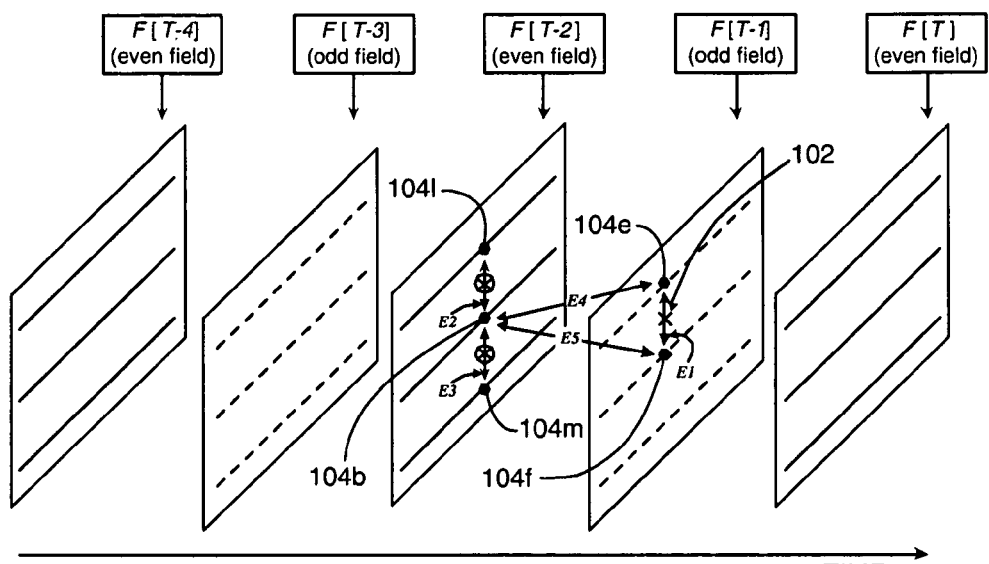
FIG. 6 is a diagram of an example set of fields used in an edge mode data access pattern for determining a static threshold setting.

Referring to FIG. 6, a diagram of an example set 200 of fields used in an edge mode data access pattern for determining a static threshold setting is shown. The functionality of edge detection generally determines whether the target pixel 102 is on an edge or not. If the target pixel 102 is on an edge, one of the two static threshold $TH_{static}$ settings may be used for the motion detection. Multiple (e.g., five) checks for edges may be conducted by the edge mode analysis circuit 120. A first spatial edge may be defined as a luminance difference (e.g., E1) within the current field F[T-1] surrounding the target pixel location. Two other spatial edges may be defined as luminance differences (e.g., E2 and E3) within a previously synthesized field $F_S$[T-2]. Two temporal edges may be defined as luminance differences between the current field F[T-1] and the previous field F[T-2].

Figure 7:
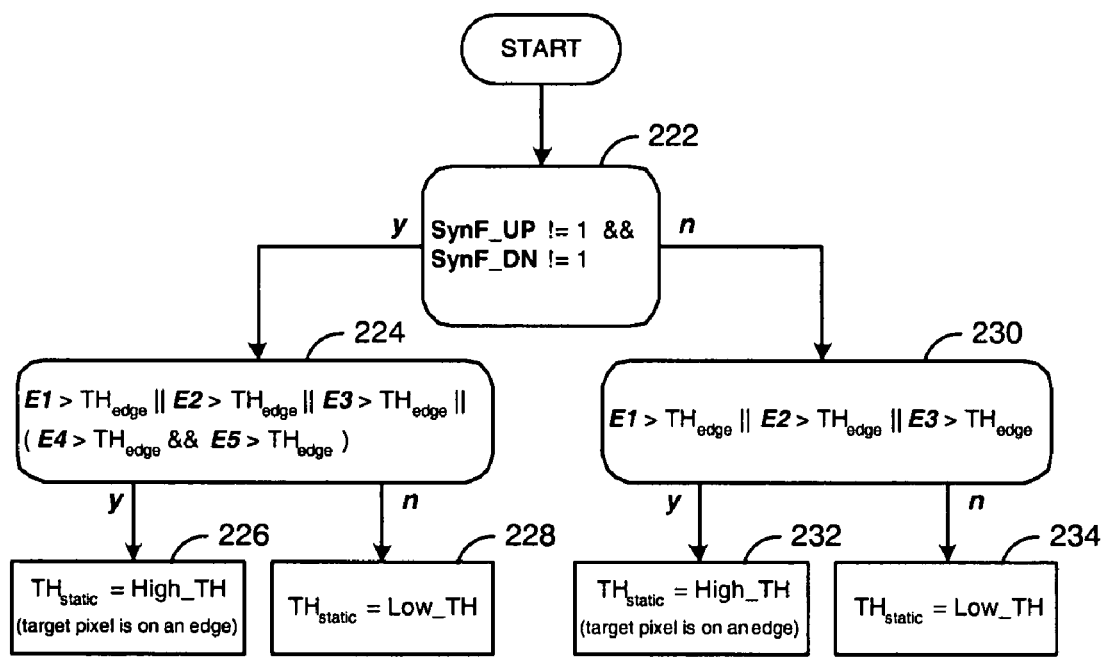
FIG. 7 is a flow diagram of an example method for determining the edge mode of the target pixel.

Referring to FIG. 7, a flow diagram of an example method 220 for determining the edge mode value of the target pixel is shown. The method 220 generally comprises a step (or block)

222, a step (or block) 224, a step (or block) 226, a step (or block) 228, a step (or block) 230, a step (or block) 232 and a step (or block) 234.

In the step 222, the motion mode values of two synthesized pixels (e.g., SynF_UP and SynF_DN) are checked. If both motion mode values are not the moving value (e.g., the yes branch of the step 222), all of the difference values E1-E5 may be considered. If either or both of the motion mode values are the still value (e.g., the no branch of the step 222), only the difference values E1-E3 may be considered.

The target pixel 102 may be considered on an edge and the static threshold $TH_{STATIC}$ may be set to a high level in the step 232 if any one or more of the three differences E1, E2, or E3 is greater than an edge threshold $TH_{EDGE}$ (e.g., the yes branch of the step 230). Otherwise, if all of the differences E1, E2 and E3 are less that the edge threshold $TH_{EDGE}$ (e.g., the no branch of step 230), the static threshold $TH_{STATIC}$ may be set to a low level in the step 234.

To increase stability of the edge detection, the two motion modes from the preceding synthesized pixels may be introduced into the decision process. For a stationary area with some noise, the two motion modes with the E4 and E5 criteria may help the edge mode analysis circuit 120 reach a correct result in the step 224. If one or more of the pixel differences E1, E2 and E3, or both of the pixel differences E4 and E5 are above the edge threshold $TH_{EDGE}$ (e.g., the yes branch of step 224), the static threshold $TH_{STATIC}$ may be set to the high level in the step 226. Otherwise, the static threshold $TH_{STATIC}$ may be set to the low level in the step 228. After the edge information of the current target pixel 102 is determined, the edge information may also be stored into the edge mode region of the memory circuit 116 for future reference.

After the motion detector circuit 112 distinguishes the motion status of a target pixel 102, a value for the target pixel 102 may be synthesized by an interpolation filter. A number (e.g., three) of different interpolation filters may be implemented to provide multiple different results from which the value of the target pixel 102 may be determined. The decision circuit 130 generally identifies the best candidate value from among the available candidate values according to location characteristics of the target pixel 102. The interpolation filters may include, but are not limited to, (i) the ELA-based intra-field interpolation, (ii) the pixel-based motion compensation interpolation and (iii) the inter-field interpolation.

The ELA interpolation circuit 124 may be operational to generate the ELA candidate value. The ELA interpolation circuit 124 may also be operational to generate the forced-edge mode value in the signal FORCED-EDGE. The ELA interpolation circuit 124 generally utilizes directional correlation to interpolate a missing line between two adjacent lines of the even (or odd) field. The ELA method may provide a good result in regions where the edge may be estimated correctly. However, if a target pixel 102 is at an object boundary or in high spatial-frequency areas, an adequate edge may not be found. In such situations, the ELA may assert the mode signal FORCED-EDGE and output a candidate value by averaging an above-target pixel with an under-target pixel in the current field F[T−1].

Figure 8:
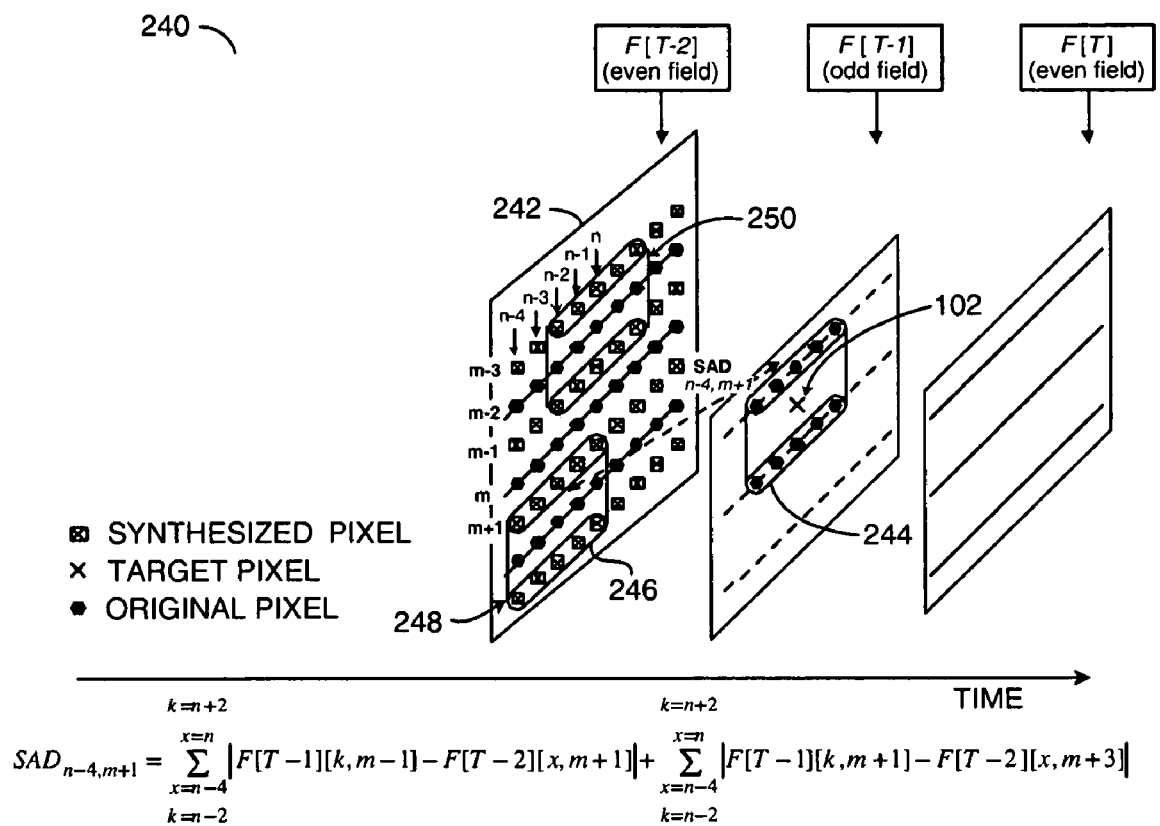
FIG. 8 is a diagram of an example set of fields illustrating reference patterns for a first level of a motion estimation interpolation.

Referring to FIG. 8, a diagram of an example set 240 of fields illustrating reference patterns for a first level of a motion estimation interpolation is shown. The ME interpolation circuit 126 is generally designed to compensate for forced-edge artifacts and the edge flicker of an object's tiny movements. Thus, only a small (e.g., 9 pixels horizontally×7 pixels vertically) search window 242 in a previously synthesized frame may be used for motion estimation. The vertical size of the search window 242 generally comprises three or four lines from the preceding original input field F[T−2] and four or three lines from the corresponding synthesized field $F_S[T-2]$.

To reduce the probability of motion mismatching, two levels of matching may be performed to locate a best candidate pixel in the search window 242 for the target pixel 102. In a first level of the matching process, a sum of absolute differences (SAD) value may be calculated between a target window 244 in the current field F[T−1] (e.g., 5 pixels on a line above the target pixel 102 and 5 pixels on a line below the target pixel 102) and a moving window 246 (e.g., 5 pixels on a first line, no pixels on a second line below the first line and 5 pixels on a third line below the second line) in the corresponding search window 242. The moving window 246 may be located in 25 different positions within the search window 242 (e.g., positions 248 and 250 are illustrated). Therefore, 25 SAD values may be calculated for the moving window 246. The SAD may be described by equation 1 shown in FIG. 9.

Figure 10:
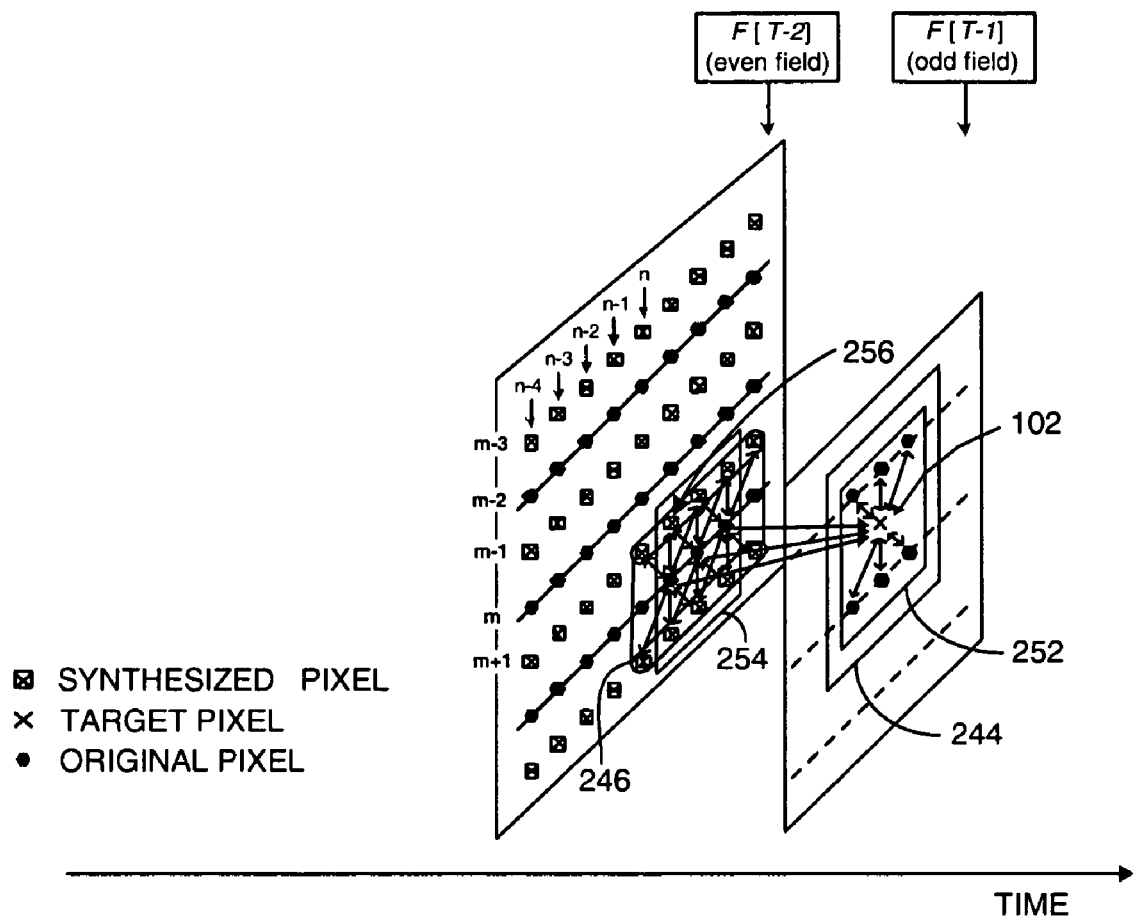
FIG. 10 is another diagram of the set of fields illustrating reference patterns for a second level of the motion estimation interpolation.

Referring to FIG. 10, another diagram of the set 240 of fields illustrating reference patterns for a second level of the motion estimation interpolation is shown. After the 25 SAD values have been calculated and sorted, a sub-window 252 (e.g., 3 pixels on the line above the target pixel 102 and 3 pixels on the line below the target pixel 102) may be compared with a moving 5×3 pixel sub-window 254 in the moving window 246 at the best location 256. Three comparisons may be made with the moving sub-window 254 in three positions to generate three SAD values. The position of the minimum SAD value generally identifies a best sub-position for the second matching process.

In the second level of matching process, the middle three pixels in the moving sub-window 254 may be candidates for generating the target pixel 102. To pick up the final output pixel among the three pixels, first, a SAD value may be calculated between each of the three pixels and the corresponding 3-pixel up-line/down-line. For example, the moving sub-window 254 at the position 256 (e.g., [N, M+1]) may have the minimum SAD value in the first level of matching process. Therefore, one of the pixels F[T−2][N+1, M+2], F[T−2][N+2, M+2] or F[T−2][N+3, M+2] may be the final output pixel of the ME interpolation circuit 126. The three SAD values may be described by equation 2 as shown in FIG. 9.

The second SAD values may be calculated by accumulating the absolute difference of each of the three pixels and 3-pixel up-line/3-pixel down-line in the sub-window 252, as described by equation 3 shown in FIG. 9. Also, "x" generally denotes the horizontal locations of the 3-pixel up-line/3-pixel down-line of the sub-window 252, which may be N−1, N, and N+1. Finally, the output candidate value of the ME interpolation circuit 126 may be the same value of the pixel having the minimum absolute value of $SAD'_{I,M+2}-SAD''_{I,M}$.

Figure 11:
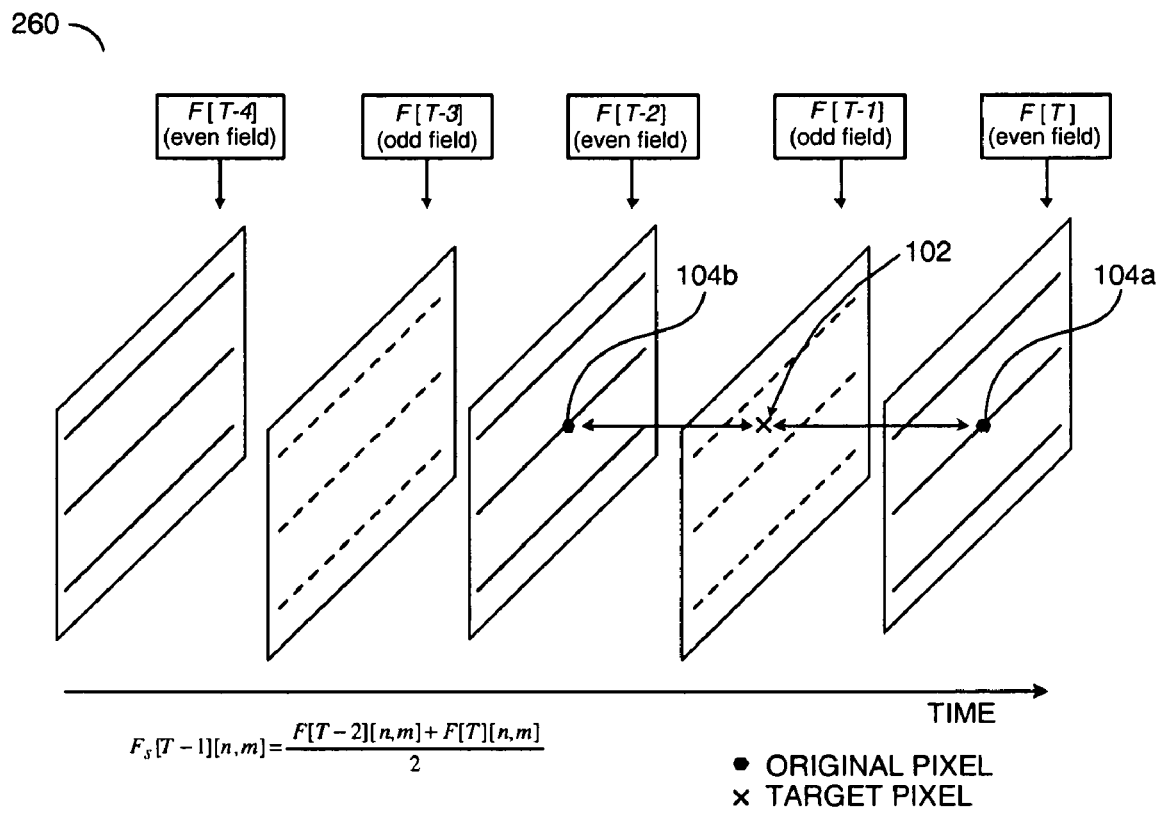
FIG. 11 is a diagram of a set of fields illustrating a reference pattern for an inter-field interpolation.

Referring to FIG. 11, a diagram of a set 260 of fields illustrating a reference pattern for an inter-field interpolation is shown. The inter-field interpolation scheme generally synthesizes a candidate value for the target pixel 102 by averaging the corresponding same-position pixels 104b and 104a in the preceding field F[T−2] and the next field F[T], respectively. For a stationary area, the video quality generated by the inter-field interpolation scheme is generally better than that by the intra-field interpolation scheme.

The decision circuit 130 generally receives the three synthesized pixels from the ELA interpolation circuit 124, the ME interpolation circuit 126 and the inter-field interpolation circuit 128. The forced-edge mode value may also be received by the decision circuit 130 from the ELA interpolation circuit 124. Furthermore, the decision circuit 130 may also receive the edge mode value and the motion mode value from the motion detector circuit 112. Based on the target mode values (e.g., edge mode value, motion mode value and forced-edge mode value), the decision circuit 130 may identify a particular one among the three candidate values (e.g., ELA candidate value, ME candidate value and inter-field candidate value) as the synthesized value for the target pixel 102.

The decision rules used by the decision circuit 130 are generally described in TABLE I. A column "Motion Mode" generally denotes whether the target pixel 102 is considered in a stationary area or a moving area, as signaled from the motion detector circuit 112. A column "Edge Mode" generally denotes whether the target pixel 102 is in an edge region or not, as signaled from the edge mode analysis circuit 120. If the target pixel 102 is in a stationary area and is not in an edge region, the value for the target pixel 102 may be the inter-field candidate value received from the inter-field interpolation circuit 128. However, if the target pixel 102 is in an edge region, the target value for the target pixel 102 may be one of the two candidate values received from the inter-field interpolation circuit 128 and the ME interpolation circuit 126. Discriminating between the two candidate values may be according to the SAD values calculated from the relationship between each of the two candidates and the 3-pixel up-line/3-pixel down-line of the target pixel 102 per equation 4 as shown in FIG. 9. The candidate value having the minimum SAD value may be the best candidate.

TABLE I

| Motion Mode | Edge Mode | Forced Edge | Target Pixel |
|---|---|---|---|
| Still | no | X | $F_{Inter}$ |
| Still | yes | X | $F_{Inter}$ or $F_{ME}$ |
| Moving | X | no | $F_{ELA}$ |
| Moving | X | yes | $F_{ELA}$ or $F_{ME}$ |

Note:
X means "don't care"

A forced-edge is signaled from the ELA interpolation circuit 124. If the target pixel 102 belongs to a moving area and the ELA interpolation circuit 124 finds an adequate directional correlation among the pixels making up the 25-pixel up-line/25-pixel down-line of the target pixel 102, the target value for the pixel 102 may be determined by averaging the two correlated pixels. However, if the ELA interpolation circuit 124 cannot find an adequate correlation from the up-line/down-line of the target pixel 102, the ELA interpolation circuit 124 may assert the mode signal FORCED-EDGE and output a temporary candidate value by averaging an above-target pixel with an under-target pixel in the current field F[T−1]. The temporary candidate value or the ME candidate value may be used for the final output by the decision circuit 130. The selection is generally made according to (i) the SAD values calculated from the relationship between each of the two candidates and, separately, (ii) the 3-pixel up-line and the 3-pixel down-line of the target pixel 102, per equations 5 and 6 as shown in FIG. 9. Therefore, the final output value for the target pixel 102 may be the candidate value having the maximum absolute difference value of $SAD_{I,UP}-SAD_{I,DOWN}$.

The function performed by the flow diagrams of FIGS. 5 and 7 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the essence and scope of the invention.

The invention claimed is:

1. A method for de-interlacing, comprising the steps of:
 (A) determining a plurality of target mode values for a target pixel using a motion detector circuit, said target pixel being synthesized to convert a current field into a current frame, wherein at least two of said target mode values are based on both (i) a plurality of original pixels and (ii) a plurality of synthesized pixels in a plurality of synthesized frames;
 (B) generating a plurality of candidate values for said target pixel using a plurality of interpolation techniques that includes a motion estimation interpolation utilizing a particular one of said synthesized frames; and
 (C) selecting a particular one of said candidate values for said target pixel using an interpolation circuit in response to said target mode values.

2. The method according to claim 1, wherein said motion estimation interpolation comprises a step of:
 matching a first window in said current frame and surrounding said target pixel to a best match window of a plurality of a second windows in said particular synthesized frame, wherein (i) each of said second windows include a plurality of said synthesized pixels and (ii) generation of said particular synthesized frame precedes generation of said current field.

3. The method according to claim 2, wherein said motion estimation interpolation further comprises the step of:
 matching a first sub-window within said first window and surrounding said target pixel to a best match sub-window of a plurality of second sub-windows within said best match window.

4. The method according to claim 3, wherein said motion estimation interpolation further comprises the step of:
 setting a motion compensated value of said candidate values from said best match sub-window.

5. The method according to claim 1, further comprising the steps of:
 measuring a luminance differences between each pair of said original pixels in a plurality an inter-field pixel pairs that are (i) spatially and (ii) temporally proximate said target pixel; and
 comparing said luminance differences against a static threshold to determine if said target pixel is stationary.

6. The method according to claim 5, further comprising the step of:

checking a motion for each of a predetermined number of said previously synthesized pixels in a plurality of said synthesized frames to determine if said target pixel is said stationary.

7. The method according to claim 1, wherein step (A) comprises the sub-step of:
generating an edge mode value of said target mode values based on (i) a first number of said original pixels in said current field, (ii) a second number of said original pixels in a given one of said synthesized frames and (ii) a third number of said synthesized pixels in said given synthesized frame.

8. The method according to claim 1, wherein step (A) comprises the sub-step of:
generating a motion mode value of said target mode values based on (i) a first predetermined number of said synthesized pixels in a first of said synthesized frames and (ii) a second predetermined number of said synthesized pixels in a second of said synthesized frames.

9. The method according to claim 1, wherein said interpolation techniques comprise an edge-based line average interpolation utilizing a predetermined number of said original pixels in said current field.

10. The method according to claim 1, wherein said interpolation techniques comprises an inter-field interpolation utilizing a plurality of said original pixels having a same spatial position as said target pixel.

11. A system comprising:
a motion detector circuit configured to determine a plurality of target mode signals for a target pixel being synthesized to convert a current field into a current frame, wherein at least two of said target mode signals are based on both (i) a plurality of original pixels and (ii) a plurality of synthesized pixels in a plurality of synthesized frames; and
an interpolation circuit configured to (i) generate a plurality of candidate values for said target pixel using a plurality of interpolation techniques that includes a motion estimation interpolation utilizing a particular one of said synthesized frames and (ii) select a particular one of said candidate values for said target pixel in response to said target mode signals.

12. The system according to claim 11, wherein said interpolation circuit comprises:
a motion estimation interpolation circuit configured to match a first window in said current frame and surrounding said target pixel to a best match window of a plurality of a second windows in said particular synthesized frame, wherein (i) each of said second windows include a plurality of said synthesized pixels and (ii) generation of said particular synthesized frame precedes generation of said current field.

13. The system according to claim 12, wherein said motion estimation interpolation circuit is further configured to match a first sub-window within said first window and surrounding said target pixel to a best match sub-window of a plurality of second sub-windows within said best match window.

14. The system according to claim 11, wherein said motion detector circuit comprises:
an edge mode analysis circuit configured to generate an edge mode signal of said target mode signals based on (i) a first number of said original pixels in said current field, (ii) a second number of said original pixels in a given one of said synthesized frames and (ii) a third number of said synthesized pixels in said given synthesized frame.

15. The system according to claim 11, wherein said motion detector circuit comprises:
a motion mode analysis circuit configured to generate a motion mode signal of said target mode signals based on (i) a luminance value for each a plurality of said original pixels and (ii) a motion value for each of a plurality of said synthesized pixels.

16. The system according to claim 11, wherein said interpolation circuit comprises:
an edge-based line average interpolation circuit configured to generate an average value of said candidate values utilizing a predetermined number of said original pixels in said current field.

17. The system according to claim 11, wherein said interpolation circuit comprises:
a inter-field interpolation circuit configured to generate an inter-field value of said candidate values utilizing a plurality of said original pixels having a same spatial position as said target pixel.

18. The system according to claim 11, wherein said interpolation circuit comprises:
an edge-based line average interpolation circuit configured to generate a forced-edge mode signal of said target mode signals in response to a plurality of said original pixels in said current field.

19. The system according to claim 11, wherein said interpolation circuit comprises:
a decision circuit configured to select said particular candidate value for said target pixel in response to both (i) said target mode signals and (ii) a predetermined number of original pixels.

20. A system comprising:
means for determining a plurality of target mode values for a target pixel being synthesized to convert a current field into a current frame, wherein at least two of said target mode values are based on both (i) a plurality of original pixels and (ii) a plurality of synthesized pixels in a plurality of synthesized frames;
means for generating a plurality of candidate values for said target pixel using a plurality of interpolation techniques that includes a motion estimation interpolation utilizing a particular one of said synthesized frames; and
means for selecting a particular one of said candidate values for said target pixel in response to said target mode values.

* * * * *